June 28, 1938. D. ROBERTS 2,121,827
STRIPPING
Filed Oct. 7, 1935
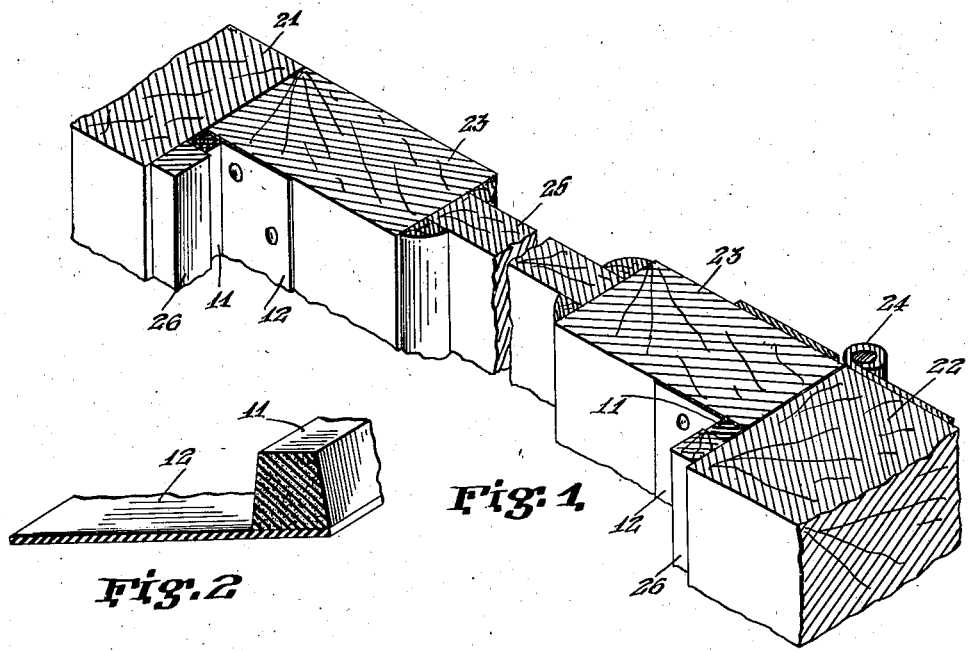
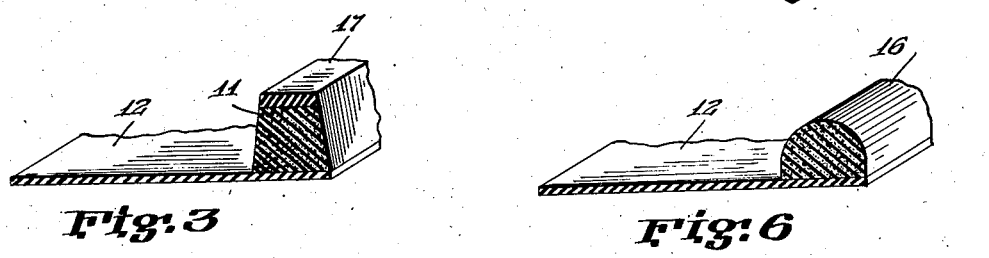
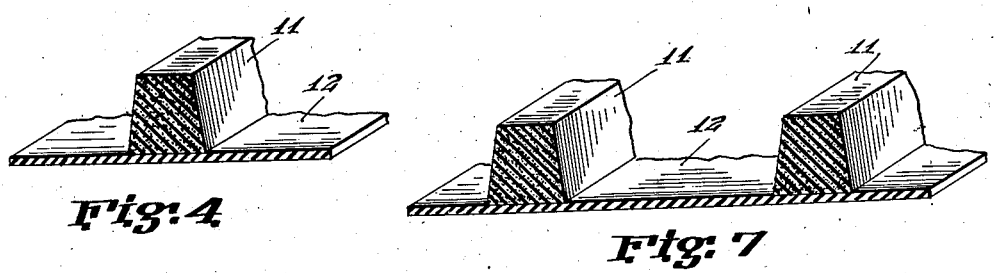
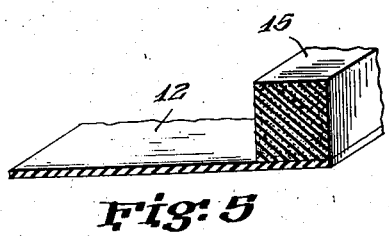
INVENTOR.
Dudley Roberts
BY
ATTORNEY.

Patented June 28, 1938

2,121,827

UNITED STATES PATENT OFFICE 2,121,827

STRIPPING

Dudley Roberts, New York, N. Y., assignor to Rubatex Products, Inc., New York, N. Y., a corporation of Delaware Application October 7, 1935, Serial No. 43,808

3 Claims. (Cl. 20—69)

My invention relates to a novel article of manuture and more particularly, relates to a novel rubber composition gasket and methods of making the same.

Although rubber compositions have been used heretofore for gaskets and the like, these have usually had the defect that the rubber weathers, readily and soon becomes deteriorated. Moreover, ordinary rubber also has the defect that it soon takes on a permanent set so that it leaves cracks and loses its sealing properties. Furthermore, the manufacture of such rubber and its application is complex and costly.

Accordingly, I have as an object of my invention to provide a novel gasket structure and method of making the same.

A further object of my invention is to provide a gasket made of gas expanded rubber.

Still another object of my invention is to provide a novel combination of gas expanded rubber which retains its flexibility and a hard rubber.

There are other objects of my invention which together with the foregoing will appear in the extended description which is to follow, in which:

Figure 1 is a perspective view illustrating one of many applications of the gasket.

Figure 2 is a perspective view illustrating one form of my novel gasket.

Figure 3 is a perspective view illustrating a modified form of my novel gasket.

Figure 4 is a perspective view illustrating a modified form of mounting my novel gasket.

Figures 5 and 6 are perspective views of further modified form of gaskets.

Figure 7 illustrates the mounting of a plurality of gaskets.

The rubber composition which I use is an expanded rubber impregnated with a gas, preferably nitrogen, and expanded to more than eight times its original volume by a novel process described in co-pending application S. N. 717,550, filed March 27, 1934, of which I am a joint applicant.

As there described, a novel rubber composition (details of which will be given hereinafter) comprising a cellular rubber in which each of the minute cells containing gas at a high pressure are sealed. This sealed cellular rubber is relatively much softer than solid rubber, thus supplying one of the essential properties desired. Inasmuch as each cell is sealed from all other cells, it does not absorb water or moisture from the air and therefore is not so readily attacked by atmospheric conditions. Finally, it may be given considerably greater ruggedness than can be obtained with solid rubber approaching the softness of this rubber.

The ingredients entering into the product are mixed in approximately the following percentages by weight:

|  | Per cent |
| --- | --- |
| Washed first grade pale crepe or smoked rubber | 40–75 |
| Sulphur | 6–30 |
| Light calcined magnesia | 3–5 |
| Ground gilsonite | 12 |
| Lower melting bituminous substances | 12 |

The base ingredient of the product is the rubber which is preferably of a pale crepe grade #1, obtained in sheets about $\frac{1}{32}$" to $\frac{1}{16}$" x 10" x 20".

These sheets of rubber are passed through masticating mills consisting of two rollers rotating in opposite directions as in the case of meshing gears. One roller, however, rotates slightly faster than the other, so that the rubber fed between the rolls tends to rub on the surfaces of the different speed rolls and a nib is formed as shown at 11, Fig. 2, of the copending application, S. N. 717,550, referred to above. The extent of this nib depends on the relative speeds of the rolls and the nib in turn determines how much of the two surfaces 12 and 13 of the rubber engage and are masticated by the respective rolls 14 and 15.

The rolls are steam heated to a temperature of approximately 150° F. as the rubber sheets are fed between them. The rubber is masticated or softened in this process, the individual sheets combining into a single mass of soft rubber, the degree of mastication depending on the spacing of the rolls, the temperature and the period of operation. We have found, however, that a mastication of one pound per minute at a roller temperature of 150° F. is sufficient for our purposes.

To this resulting soft rubber mass is now added an asphalt product or soft bitumin, such as suffron or mineral rubber. This asphalt is divided into fine particles and passed through a sixteen mesh sieve. While the rubber revolves on the masticating rollers, these particles of bitumin are shovelled on and are uniformly distributed over the rubber. The heat of the rubber melts the bitumin which penetrates into and is absorbed by the rubber.

The bitumin acts as a flux at low temperatures in the stage of partial vulcanization to be explained hereinafter. Any other low temperature flux may be substituted, i. e., a low melting hydrocarbon of the asphaltic group of a bituminous or waxy nature having fluxing properties, such as paraffin wax and stearic acid. During this stage the rubber has turned from a light to a dark color.

Ground gilsonite, divided into even finer particles than bitumin and passed through a one hundred and sixty mesh sieve, is now sprinkled or shovelled on the rubber, still passing through the masticating rolls. Gilsonite is an asphalt like bitumin, but has a much higher melting point. It will, accordingly, not be melted by the rubber but will nevertheless penetrate into, impregnate and be absorbed by the soft, spongy mass of rubber. Gilsonite functions as a flux in a high temperature stage to be described hereinafter, and may accordingly, be replaced by any suitable high temperature flux such as a high temperature asphalt. In using the expression "flux", it will be understood that we mean a substance acting to amalgamate or assist in the vulcanizing.

Summarizing the above, three stages have been described. In the first, the rolls were heated to a temperature of 150° F. while masticating or softening the rubber to combine the individual sheets into a single soft, spongy mass. Assuming twenty-four pounds of rubber, twenty-four minutes may ordinarily be required for this operation.

In the second stage, a low temperature flux is applied to the rubber as it continues to pass over the rolls in the proportions given above and this, by reason of the heat, melts into and is absorbed by the rubber.

In the third stage, a high temperature flux is admixed with the rubber while it passes through the rolls, again in the proportions given above.

The second and third stages take fourteen minutes additional to the twenty-four minutes for mastication and result in a rubber impregnated with a high and low temperature hydrocarbon. The molecular structure of rubber is theoretically described as normally being in the form of a spiral. This may be thought as giving to the rubber its elasticity and strength. During the working of the rubber described above, a disturbance of the molecular structure apparently occurs and the rubber tends to lose its natural qualities.

It is essential to provide a rest period for the rubber at this stage of the operations to permit the rubber to restore itself to its original condition.

Accordingly, in the next or fourth stage, the rubber, now flat, soft and porous, is permitted to cool off, and is left to rest for about twelve hours, preferably in a dark, dry room at a temperature of from 80° to 100° F. The longer the rest period, the more the rubber regains its original conditions, but we have found that twelve hours will ordinarily be sufficient to restore it to about its original condition.

Following this rest period, these slabs of rubber are placed on rolls maintained at temperatures of from 120° to 130° F. As the rubber passes between the rolls, additional slabs are added, which ultimately combine into a soft mass of rubber. When the mass has been formed with adjacent engaging surfaces adhering, sulphur and light calcined magnesia, in the proportions given above, are added as the rolls rotate. Sulphur is the vulcanizer and the light calcined magnesia is the rubber toughener. Any equivalent rubber toughener, such as zinc oxide, may replace the calcined magnesia. For thorough absorption, the rolling is continued for a period of about twenty minutes.

The product is now removed from the rolls in strips or slabs of about one-half inch in thickness and two feet in length. The distorting effect of passing the rubber through the rolls is now again corrected by providing a second twenty-four hour rest period in a dark, warm, dry room at about the same temperature as the previous rest period. Again, the length of the rest period may vary, but at least twenty-four hours is necessary and the longer this period, the more nearly the rubber is restored to normal.

The rubber is now placed on a warmer mill consisting of two rollers rotating at the same speed. The rubber is fed between the rolls maintained at a temperature of from 120° to 140° F. This is continued until the rubber again becomes soft and forms into a uniform plastic composite mass and during which the rubber may be formed into slabs, boards, etc., after which a further rest period of twelve hours is provided. Or, if desired, the rubber may be passed through a forcing machine which we prefer to use for preforming the rubber in any desired shape, such as aeroplane wings, struts, pontoons, etc. If preferred, the forcing operations may also be used to soften the rubber in the earlier roller stages described hereinbefore.

The various stages of treatment described above have resulted in agitating the rubber to such an extent that a quantity of air has been absorbed by the rubber. The presence of this air may have serious deteriorating effect during the subsequent stages to be described hereinafter. This may be described as follows:

Like glass, rubber is a plastic or super-cooled viscous liquid. Normally, it would be crystalline, but is prevented from becoming so because of the complexity of the molecules which are large and slow-moving due to the viscosity of the mixture. This super-cooled viscous liquid is chemically an unstable product which tends to stabilize itself. This is particularly true if the rubber is warmed to just below melting point which favors crystallization. The presence of air under these conditions is particularly conducive to crystallization, a simple oxidation resulting from a relatively simple rubber compound which crystallizes out.

Moreover, rubber oxidizes easily because it has unsaturations or double bonds which tend to readily combine with the oxygen, especially under the influence of heat and pressure, thus making the rubber brittle. In the presence of air, rubber, therefore, tends to oxidize. Attacked or oxidized by even a small amount of air, the rubber becomes brittle, as is well known.

To prevent this, the rubber, as is commonly known, is vulcanized, i. e., stabilized. This consists in heating the rubber with sulphur to form a vulcanized or stable product so that it no longer tends to combine with oxygen in the air. The sulphur forms a mixture of complex compounds which prevents crystallization and oxidation.

The presence, however, of even a small quantity of air may result in an oxidation for the reasons explained above, even before vulcanization sets in.

Accordingly, it is important to force out all the air that may have mixed with the rubber before the stage of partial vulcanization, to be described, occurs.

To this end, the rubber is passed between successive calenders maintained at a temperature of from 130° to 150° F. The calender mill comprises a series of rolls decreasingly spaced from each other in successive steps. In the first step, as shown in Fig. 4, of the application S. N. 717,550 referred to above, the rolls are relatively far apart, in the next stage, closer, etc. The rubber passing through the calenders forces all the trapped air out and is reduced in size. After the rubber passes the last rolls, a sheet of cloth is applied thereto to close faults appearing in the rubber and to prevent the rubber from contracting. The cloth, having a limited expansion, keeps the stretch in rubber and maintains it a predetermined thickness.

The rubber is now cooled to room temperature and the cloth removed, leaving a sheet of untreated rubber. The product is now ready for the two final stages of vulcanization to be described. These vary somewhat for different products. Approximately ten such sheets of rubber may be placed with metal sheets interposed between each sheet of rubber, and the whole placed in a metal container having an internal dimension slightly larger than the combined sheets. A cover is then fastened into place on the container. A number of these containers are then placed into a gassing autoclave which is then closed and fastened down. The autoclave has previously been aired by passing steam through the container and heating it to a temperature of from 180° to 212° F. to remove moisture.

A vacuum pump is then connected to an inlet of the container to extract the air until a vacuum of about five inches is obtained. The evacuation is important for the reasons already pointed out hereinbefore. When the container has been evacuated, gas is admitted into the autoclave at a pressure of from 150 to 200 atmospheres. Any inert gas, preferably non-combustible, and having no affinity for raw rubber, such as nitrogen (N), ammonia (NH$_3$), helium (He), may be used for this. Thus air would be disastrous, if used. Forcing air into raw rubber at several hundred atmospheres pressure and at or near vulcanizing temperatures, would tend to oxidize the rubber very rapidly and before vulcanization set in, resulting in an undesirable product. Moreover, it would be dangerous practice, because a spark would cause a terrific explosion.

While the gas is being forced into the rubber, steam at eight pounds pressure is admitted to the steam chest. About thirty minutes are necessary to reach a stable temperature for the container to reach a stable temperature and thereafter the container is maintained at the same temperature continuing to supply steam at about eight pounds pressure.

The conditions in this stage are critical and accordingly both the pressure of the gas and the temperature of the container must be correct. The rubber, while exposed to the gas, is in a soft plastic state and therefore readily receives the gas. The eight pounds of steam in the steam jacket produce a temperature at which partial vulcanization proceeds to a substantially uniform degree throughout the body of the rubber. This partial vulcanization functions to harden the rubber sufficiently so that it retains the gas forced into the rubber. At this time substantially little or no expansion of the rubber has taken place due to its confinement within the container.

The autoclave is now permitted to cool off under atmospheric conditions and subsequently cold water is forced through the steam jacket until a temperature of 60°-70° F. is reached. This permits the rubber now in semi-cured state to set.

Excess gas in the autoclave is now removed. The rubber being partially cured, will hold gas under pressure in its individual cells. The rubber sheets are now removed from the containers with the result that the pressure is removed and the gas in the cells immediately expands the rubber about four times.

The partially cured rubber is now placed in a mold suitably constructed to produce any of the forms of rubber shown in Figures 2 to 7. These may be triangular, trapezoidal, square, arched or any other desired shape.

The partially cured rubber placed in molds for producing the special shapes of rubber desired is now subjected to the final vulcanization. Each mold is placed in a mold of the desired dimensions. Each mold is placed between platens and saturated steam is applied at ninety-five pounds for about forty to forty-five minutes. This is the final stage of the process of the curing and expansion. The rubber expands to the size of the molds and at the same time complete curing or vulcanization of the rubber is obtained. The steam is now turned off and the product permitted to cool. If desired, cooling may be hastened by applying cold water. The end product is an expanded cellular inert gas filled product weighing about five pounds per cubic foot.

This stage, during which the vulcanization is completed, must take place within forty-eight hours after the completion of the partial expansion and vulcanization. Otherwise sufficient gas may escape from the partially vulcanized rubber so that there is a material loss in volume.

In the event that more than forty-eight hours elapse before the last stage of the process occurs, it is preferable to regrind the material and add it into the new dough in small percentages.

It is also possible, alternatively, in the event that more than forty-eight hours is to elapse, to take care of this condition by carrying on the first stage to a further degree of vulcanization than originally contemplated by applying the steam for a longer period of time or at a higher temperature than is obtained by eight pounds of steam.

In fact, I have found from experiments that the first stage can be carried on at from eight to sixteen pounds of steam, although better results are obtained at the lower range. When the greater degree of vulcanization occurs, the material can be kept for a longer period than forty-eight hours without the gas diffusion.

The final product, depending upon the percentages of the various ingredients used, is a soft, light rubber of multitudinous minute sealed cells, each cell apparently containing gas at a high pressure.

The resulting rubber units may be secured to each other in any well known manner as by vulcanizing and in the relative arrangements shown. The larger arches of the upper layers will provide increased softness, the smaller arches of the lower layers will provide shock absorbing action.

In order to produce further differentials in the effect of softness and hardness, a layer of sponge rubber may be vulcanized to a layer of cellular rubber.

In Figures 2 to 4, I have illustrated the finally molded rubber 11, trapezoidal in shape. The rubber 11 is secured as by vulcanization to a fabric strip 12 either at the end of the fabric as in Figure 2 or intermediate thereof as in Figure 4. If desired, a plurality of gaskets may be vulcanized to the fabric as illustrated in Figure 7.

In Figure 5, I have shown a modified shape of gasket i. e., in which the rubber has been molded into a square shape as illustrated at 15.

In Figure 6, I have shown the rubber gasket molded in the form of an arc 16. These are illustrations of only some of the numerous shapes into which the gasket can be molded.

In Figure 3, I have illustrated the rubber gasket 11 vulcanized to a hard rubber strip 17.

It will be understood that I may use a rubber base or any other suitable composition instead of the fabric 12 as a support for the gasket. Moreover, I may use sponge rubber formed in any other well known manner besides that given in detail above by way of illustration.

In Figure 1 I have illustrated one construction in which my gasket may be employed. As shown in this figure, supported between frames 21 and 22 is a door 23 hinged at 24 and having a panel 25. The rubber gasket 11, of the form shown in any one of the other figures, is secured through the fabric 12 to the door. A molding or door-stop 26 is engaged by the rubber gasket 11 when the door is closed in the position shown, by means of which a seal is formed which has substantially no set and will not, therefore, result in any leaks after a relatively short period of use.

Although in the above illustration I have shown a rubber gasket applied to doors, but it will be obvious that it may also be applied to the sealing of trucks, refrigerator doors, window sills—where it may be used as weatherstripping—shipping containers, storage boxes and storage cabinets, and other purposes where a seal is needed between two objects. It is of especial utility as windlass cord, such as is employed around the windows in automobiles. Accordingly, I do not wish to be limited by the specific illustrations of my invention, but only by the appended claims.

I claim:

1. A gasket, adapted for exposure to deleterious weathering influences, comprising a fabric strip and closed cell gas expanded rubber secured thereon, said closed cell gas expanded rubber containing a multiplicity of small sealed cells of inert gas throughout its mass.

2. A gasket, adapted for exposure to deleterious weathering influences, comprising a fabric strip and closed cell gas expanded rubber secured thereon, said closed cell gas expanded rubber containing a multiplicity of small sealed cells of inert gas throughout its mass, said closed cell gas expanded rubber being so positioned as to be directly exposed to said deleterious weathering influences.

3. A gasket, adapted for exposure to deleterious weathering influences, comprising a fabric strip; closed cell gas expanded rubber secured thereon, said closed cell gas expanded rubber containing a multiplicity of small sealed cells of inert gas throughout its mass; and a layer of rubber laminated over said closed cell gas expanded rubber to provide a strong, long wearing buffer surface for said gasket.

DUDLEY ROBERTS.